United States Patent [19]

Honda et al.

[11] Patent Number: 5,063,416
[45] Date of Patent: Nov. 5, 1991

[54] ELECTROPHOTOGRAPHIC PRINTER USING A CONTINUOUS-FORM RECORDING SHEET

[75] Inventors: Ryoji Honda, Asaka; Masahiro Kita, Tokyo; Ikuo Negoro, Sakado, all of Japan

[73] Assignee: Asahi Kogaku Kogyo Kabushiki Kaisha, Tokyo, Japan

[21] Appl. No.: 535,477

[22] Filed: Jun. 11, 1990

[30] Foreign Application Priority Data

Jun. 13, 1989 [JP] Japan ................................ 1-149976
Apr. 26, 1990 [JP] Japan ................................ 2-111210

[51] Int. Cl.⁵ .......................................... G03G 15/00
[52] U.S. Cl. .................................. 355/316; 355/317; 226/24; 226/28
[58] Field of Search ................ 355/316, 309, 317; 346/153.1, 160; 226/28, 29, 24; 358/300

[56] References Cited

U.S. PATENT DOCUMENTS

| | | |
|---|---|---|
| 4,297,716 | 10/1981 | Hirayama . |
| 4,377,333 | 3/1983 | Tsuji et al. . |
| 4,429,984 | 2/1984 | Kiba et al. . |
| 4,478,508 | 10/1984 | Kato et al. . |
| 4,563,081 | 1/1986 | Sato . |
| 4,843,429 | 6/1989 | Avritt et al. .......................... 355/274 |
| 4,890,140 | 12/1989 | Negare et al. ....................... 355/290 |
| 4,897,675 | 1/1990 | Negishi ................................ 346/154 |
| 4,912,490 | 3/1990 | Negoro et al. ....................... 346/160 |
| 4,928,133 | 5/1990 | Fulton ................................. 346/150 |
| 4,941,377 | 7/1990 | Ishihara et al. ..................... 355/310 |
| 4,949,104 | 8/1990 | Negoro et al. .................... 346/153.1 |

Primary Examiner—R. L. Moses
Attorney, Agent, or Firm—Sandler, Greenblum, & Bernstein

[57] ABSTRACT

In a printing device such as a laser beam printer utilizing a continuous-form recording sheet, two controlling members are provided for controlling the recording sheet to be discharged from the printing device after a printing operation, and for controlling the recording sheet so as to be located at a position from which a printing operation is restarted. Thus, recording sheet is not wasted when the output begins.

30 Claims, 9 Drawing Sheets

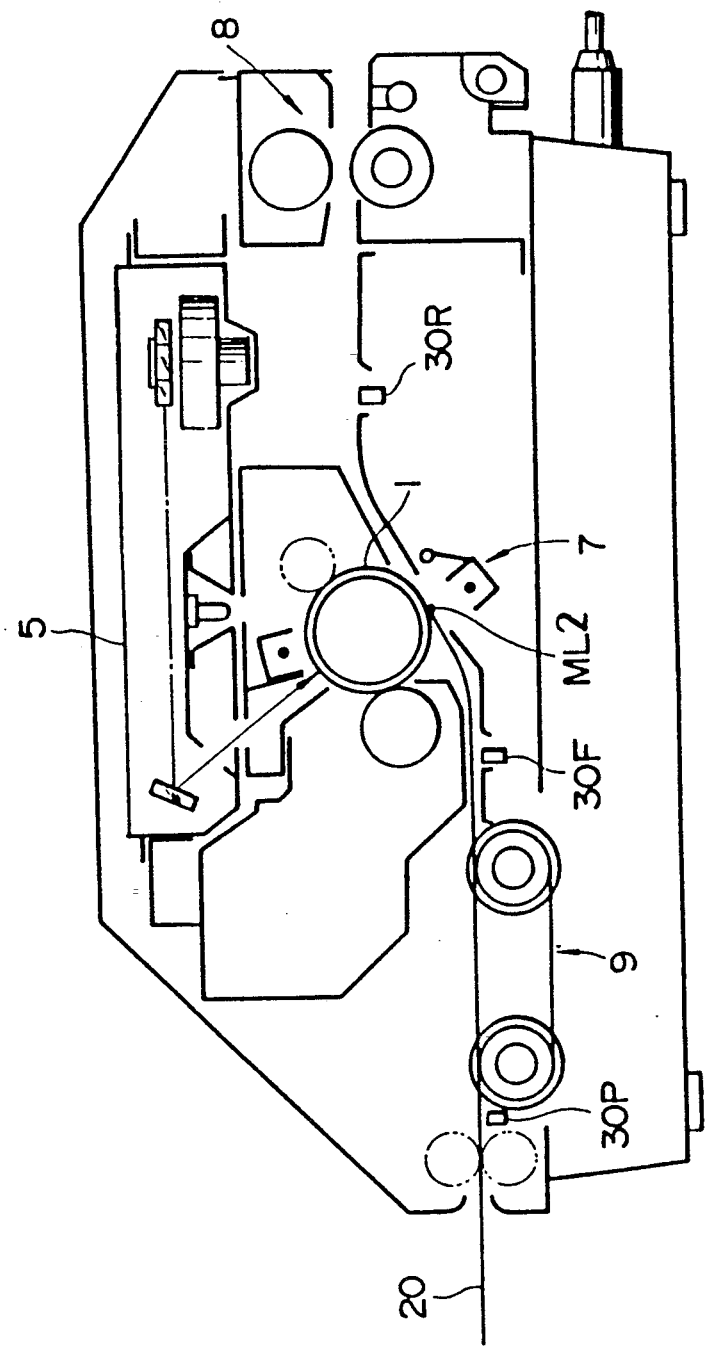

ELECTROPHOTOGRAPHIC PRINTER USING A CONTINUOUS-FORM RECORDING SHEET

BACKGROUND OF THE INVENTION

The present invention relates to a printer for forming an image on a continuous-form recording sheet using an electrophotographic method.

There have been known image forming apparatuses using a so-called electrophotographic method such an electronic copying machine, in which an electrostatic latent image is formed by exposing a photoreceptor on the surface of a charged photoconductive drum. Toner is adhered to the latent image for development, transferred to a recording sheet and fixed by a fixing unit.

One of these is a laser beam printer which provides a hard copy of image information by scanning and exposing a photoconductive drum charged by laser beams. The beams are modulated based on image information such as figures, characters and the like, using the copy process of the above electrophotographic method.

The laser beam printer is very useful, because it can be widely used in such a manner that it prints figures of information received by an image reading unit such as an image scanner or can be as used an output terminal of a facsimile machine, and it can to output information at a high speed.

In general, such a laser beam printer conventionally comprises an existing electronic copying machine as a base unit thereof and uses so-called cut-type sheets cut into a predetermined size as a recording sheet. A so-called heat roll type fixing unit which comprises a pair of fixing rollers composed of a heat roller heated to a high temperature and a backup roller pressed there against are provided. A sheet on which an unfixed toner image corresponding to the image information is placed is caused to pass between the rollers so that it is heated and pressed, whereby the toner is melted and adhered on the recording sheet.

Incidentally, the electrophotographic method is such that the rotation of a photoconductive drum causes an exposed portion thereof to reach a transfer unit and a toner image is transferred onto the recording sheet fed at a speed identical with the peripheral speed of the photoconductive drum at the transfer unit. Thus, according to this process it is impossible to form images by intermittently interrupting the process due to the structure of the process.

Therefore, the laser beam printer is provided with a memory capable of storing at least one page of information, and when the one page of information is input therein, the printer outputs the information at one time.

It can of course be desired to use this laser beam printer as an output terminal of a computer. In this case, however, the use of a continuous-form sheet similar to that used in a conventional line printer is desired. The continuous-form sheet used in the conventional line printer is a so-called fan-folded sheet having feed holes and folded along perforated tear lines to enable the sheet to be simply cut off (hereinafter, simply referred to as a "continuous sheet").

When a continuous sheet is used to a laser beam printer using a heat roll fixing system, a length of the recording sheet feed path from a transfer unit to be the fixing position of the fixing unit must be set to substantially the same as a distance between the perforated tear lines of the continuous sheet in order to prevent such a disadvantage that when the laser beam printer stops (during a pause or because operation is completed), a page being subjected to a fixing action is stopped in the state that it is held between a pair of fixing rollers and semi-fixed toner in the process of being fixed remains caught between the pair of fixing rollers.

More specifically, since the continuous-sheet is finally cut off along the perforated tear lines for use, no image must be formed within a predetermined region in the vicinity of the perforated tear lines, and thus in a laser beam printer by which images are formed for each page, of the tear lines where no image is formed are arranged to be stopped in the state that it they correspond to the transfer unit. Consequently, when the length of the recording sheet feed path from the transfer unit to the fixing position is set to substantially the same as the distance between the perforated tear lines of the continuous sheet, the above disadvantage can be avoided, because the vicinity of the tear line where no image is formed is caused to correspond to the position of the fixing unit where fixing action is effected, when the laser beam printer stops.

As a result, however, a problem arises in that the printer as a whole is made unnecessarily larger in size to provide a necessary feed length of the recording sheet and a plurality of kinds of continuous sheets respectively having a different distance between perforated tear lines (i.e., a length of a page) cannot be interchangeably used in this laser beam printer. That is, continuous sheets having a different distance between perforated tear lines cannot be used.

SUMMARY OF THE INVENTION

It is therefore an object of the invention is to provide an improved electrophotographic printer which permits a fixing unit to be freely disposed without being regulated by a distance between the perforated lines of the continuous-form sheet.

For this purpose, according to the present invention, there is provided a printing device, capable of employing at least a continuous-form recording sheet having a plurality of printing segments on which an image is to be formed, each of the segments being designated by a plurality of perforations provided on the continuous-form recording sheet at a predetermined interval. A feeling device for feeding the continuous-form recording sheet along a predetermined feeding path, a forming device for forming the image on the continuous-form recording sheet, and a fixing device for fixing the image formed by the forming device on the continuous-form recording sheet are provided the printing device further includes:

a discriminating mechanism for discriminating whether the forming operation of the image on the continuous-form recording sheet is finished a controlling mechanism for controlling the feeding device so as to feed the continuous-form recording sheet in such a manner that a trailing end of a segment on which the forming operation has been finished is located at a predetermined position following to the fixing device in case that it is discriminated by the discriminating mechanism that the forming operation is finished.

Feeding device in such a manner that the trailing end is located at the forming device after the trailing end is located at the predetermined position, whereby a leading edge of the succeeding segment to the segment on which the forming operation has been finished is located at the forming device.

DESCRIPTION OF THE ACCOMPANYING DRAWINGS

FIGS. 2A through 3D are diagrams for explaining operations of the laser beam printer illustrated in FIG. 2;

DESCRIPTION OF THE EMBODIMENTS

Figure 1:
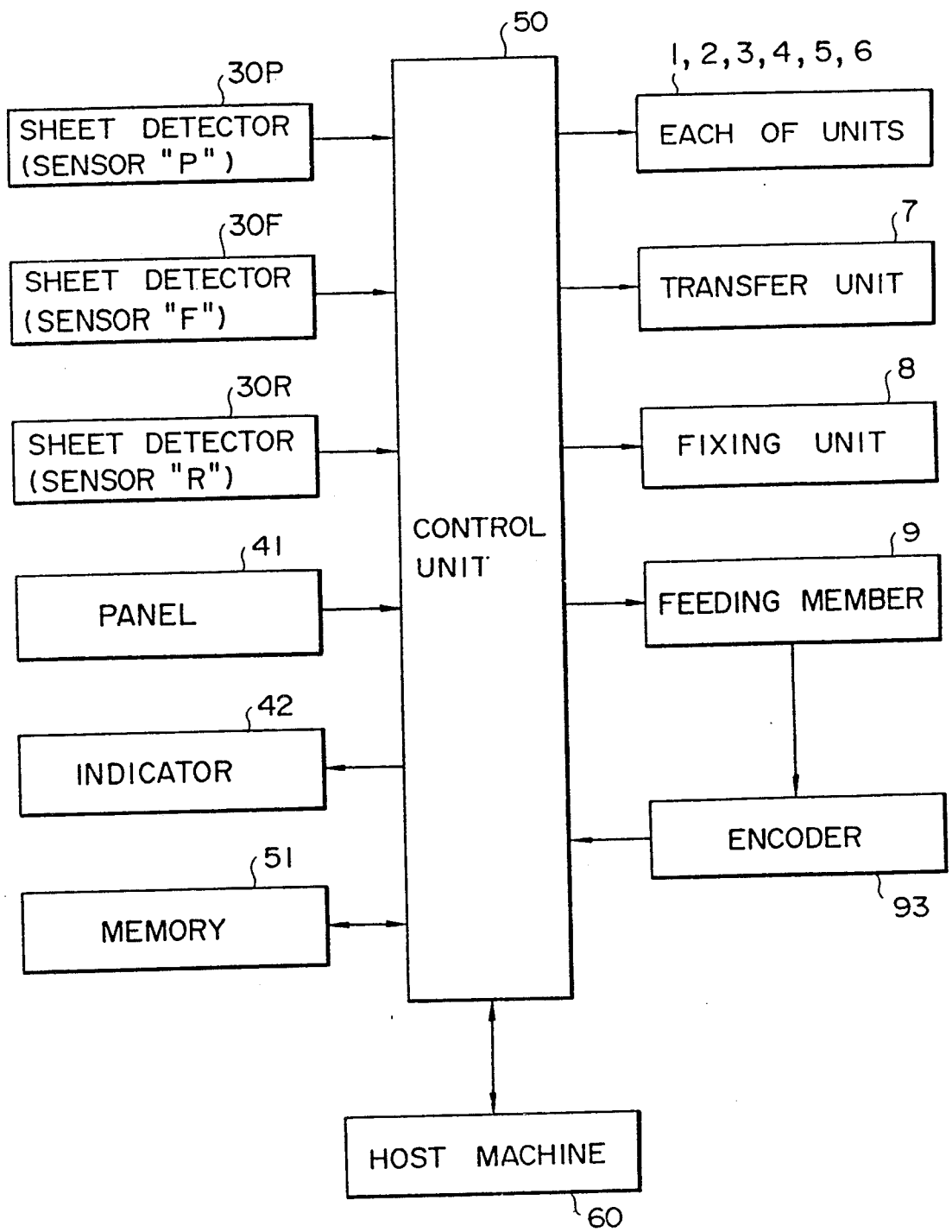
FIG. 1 shows a block diagram of control circuit of an electrophotographic printer using a continuous-form recording sheet according to the present invention.

Referring to the drawings, an embodiment of the present invention will be described hereinafter.

Figure 2:
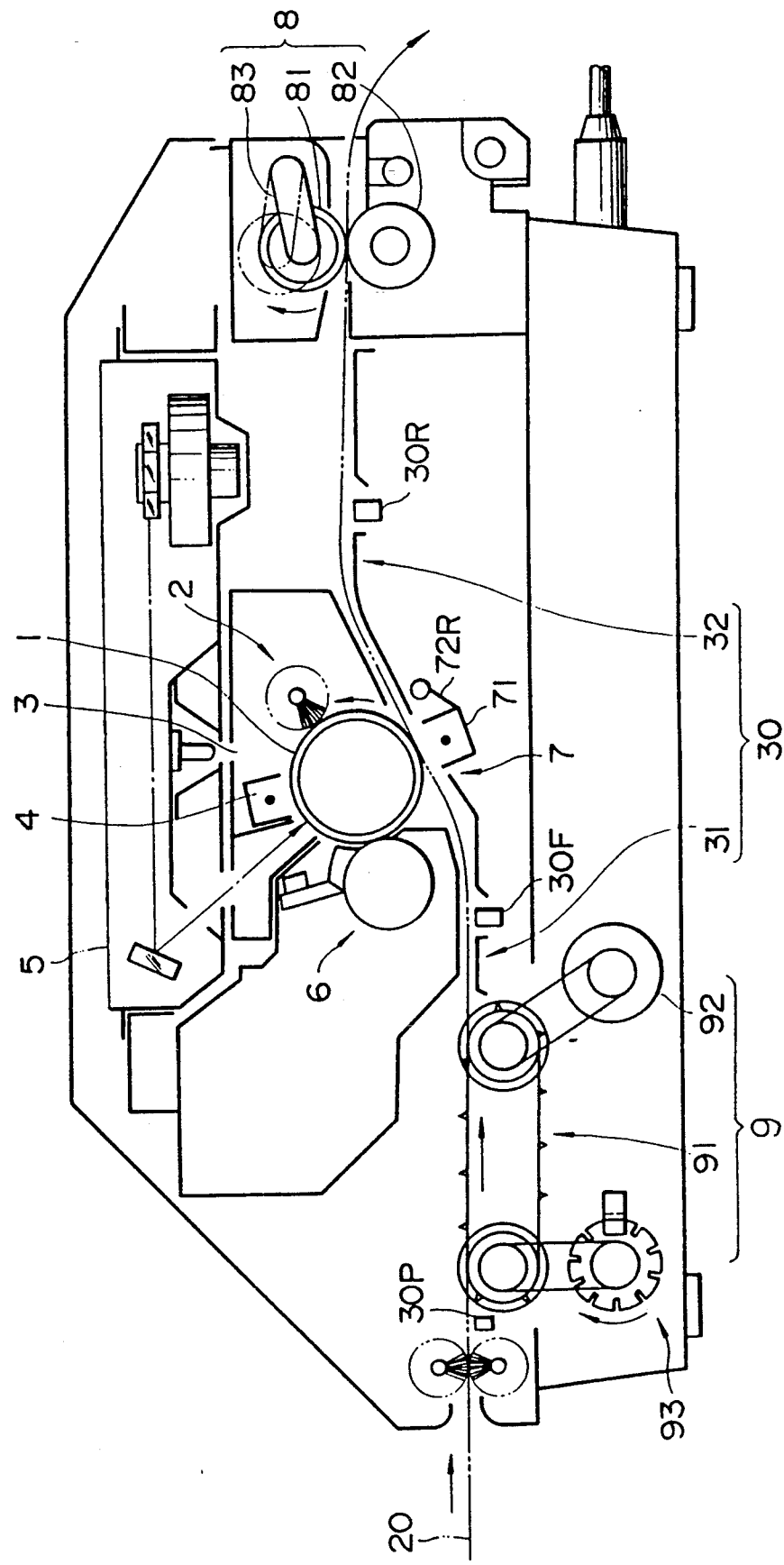
FIG. 2 is a schematic diagram of a laser beam printer according one embodiment of the present invention.

FIG. 2 is a schematic diagram of a laser beam printer as an embodiment of an electrophotographic printer using a continuous-form sheet according to the present invention. The laser beam printer forms image or character information input from a computer and the like onto a fan-folded sheet 20 as a continuous-form recording sheet by an electrophotographic method and outputs the same as hard copy.

A photoconductive drum 1 is rotated at a predetermined peripheral speed, i.e. moving speed of a circumferential surface thereof, by a main motor, not shown, and a toner cleaning unit 2, a charge removing unit 3, a charging unit 4, a scanning optical system 5 for introducing laser beams onto the photoconductive drum 1, a developing unit 6, and a transfer unit 7 are disposed along the rotating direction of the photoconductive drum 1 around the circumference thereof.

Recording sheet feed paths 30 including 31, 32 are arranged along the right and left directions in the drawing at the opposite sides of the transfer unit 7 disposed substantially beneath the photoconductive drum 1, and a tractor 9 is disposed at the recording paper feed path 31 on the introduction side, i.e., left side, and a fixing unit 8 is disposed at the recording sheet feed path 32 on the discharge side, i.e., right side: the side to which the fan-fold paper 20 is fed. Further, a plurality of recording sheet sensors 30P (sensor "P"), 30F (sensor "F"), and 30R (sensor "R") each composed of a reflection type photo-sensor are disposed along the recording sheet feed path 30 (recording paper feed path 31 on the introduction side and the recording paper feed path 32 on the discharge side) on the introduction side of the tractor 9, between the photoconductive drum 1 and the tractor 9, and between the photoconductive drum 1 and the fixing unit 8, respectively.

The laser beam printer effects a main scanning (exposing) of the surface of the photoconductive drum 1 in the direction along the rotating axis thereof by laser beams from the scanning optical system 5, rotates the photoconductive drum 1 (auxiliary scanning), develops a latent image formed on the surface of the photoconductive drum 1 at the developing unit 6 to form a toner image, transfers the toner image at the transfer unit 7 onto the fan-folded sheet 20 which is fed through the recording sheet feed path 30 by the tractor 9, fixes the toner image onto the fan-folded sheet 20 using the fixing unit 8, and then discharges the fan-folded sheet 20.

The tractor 9 comprises two endless belts 91, 91 associated with each other disposed in parallel and having projections to be engaged with the feed holes defined along the opposite sides of the fan-folded sheet 20. One the pulleys closely connecting both the endless belts 91, 91 is connected to a drive motor 92 and the thus the endless belts 91, 91 are rotated forwardly and reversely by the drive motor 92.

Further, synchronously rotatingly connected to the tractor 9 is an encoder 93 having a disc provided with a plurality of slits defined around the circumference thereof in correspondence with the projections to the endless belts 91, 91 and thus the feed speed of the fan-folded sheet 20 can be accurately determined A photo interpreter disposed with the circumference of disc held therebetween the components thereof senses the slits, that is, a feed speed of the fan-folded sheet 20 is directly determined without referring to an r.p.m. (revolutions per minute) of the drive motor 92.

The transfer unit 7 comprises a corona charging unit 71 having a length substantially the same as a width of the photoconductive drum 1 supported by an arm member 72 arranged to be rocked at the opposite ends thereof and disposed in parallel with the photoconductive drum 1 at a predetermined distance from the circumferential surface. The corona charging unit 71 can be retracted from a transfer position confronting the photoconductive drum 1 by swinging the arm members 72 by a not shown drive mechanism.

The fixing unit 8 comprises a cylindrical heat roller 81 heated to a predetermined temperature by a heating element such as a halogen lamp or the like inserted therein and a backup roller 82, the heat roller 81 and the backup roller 82 being arranged as a pair of vertically aligned fixing rollers and disposed perpendicularly to the direction in which the fan-folded sheet 20 is fed.

The upper heat roller 81 is held by swingable levers 83 at the opposite ends thereof, and when the levers 83 are swung by a not shown swinging drive mechanism, the heat roller 81 is retracted upwardly from the fixing position and separated from the fan-folded sheet 20. In addition, the lower backup roller 82 is connected to a not shown drive means and driven by it at a peripheral speed substantially similar to the feed speed of the fan-folded paper 20 fed by the tractor 9.

A control unit 50 controls, as a whole the rotation of the belts 91, 91, driven by the drive motor 92 (the feed of the fan-folded sheet 20 along the forward and reverse directions), the transfer action effected by the transfer unit 7 and the swing retraction of the corona charging unit 71 thereof, the fixing action effected by fixing unit 8 and the swing retraction of the heat roller 81 thereof, and the processing units related to the electrophotographic method (the rotation of the photoconductive drum 1, the toner cleaning unit 2, the charge removing unit 3, the charging unit 4, the scanning optical system 5, and the developing unit 6), as illustrated in the block diagram of FIG. 1. Further, information is supplied to the control unit 50 from the encoder 93 associated with the belts 91, 91 and the recording sheet sensors 30F and 30R and information relating to an operation input from the panel 41 are respectively supplied to the control unit 50. Further, the control unit 50 is provided with a memory means 51 composed of a rewritable ROM (Read Only Memory) in which data such as a sheet size, communication protocol, a number of sheets to be printed and the like which are input by the operation of the panel 41 are stored. Further, the control unit 50 controls the laser beam printer to form image information supplied from a host computer 60 and stored in a not shown page memory based on the input information. Note that, in the drawing, 42 designates a indicator unit composed of an indicating member, for example, an LCD (Liquid Crystal Display), for indicating the information relating to the occurrence of unacceptable condition and the like to an operator.

Figure 4A:
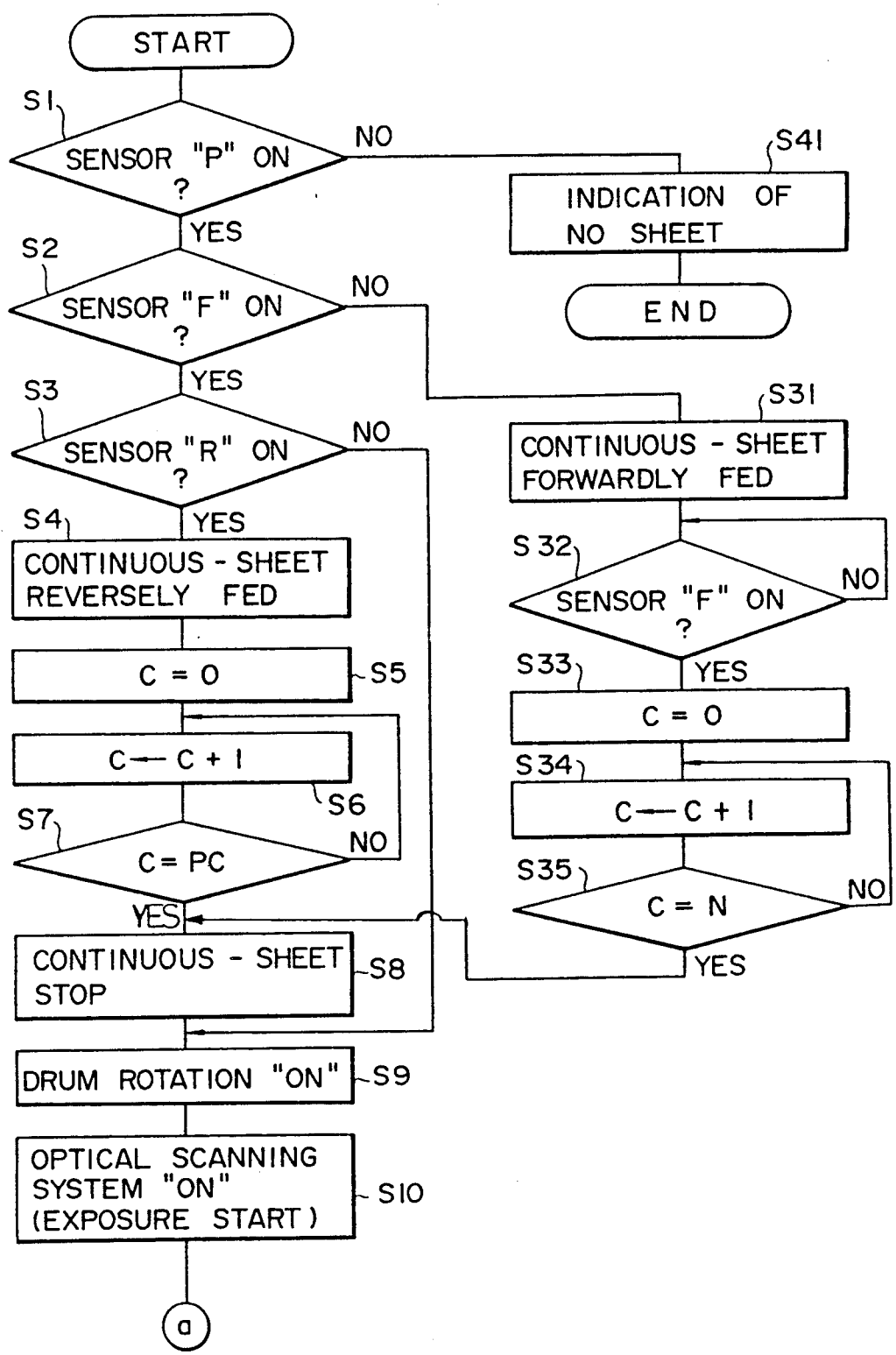
FIG.4 is a flowchart for controlling the operation of the laser beam printer of FIG. 2.
Figure 4B:
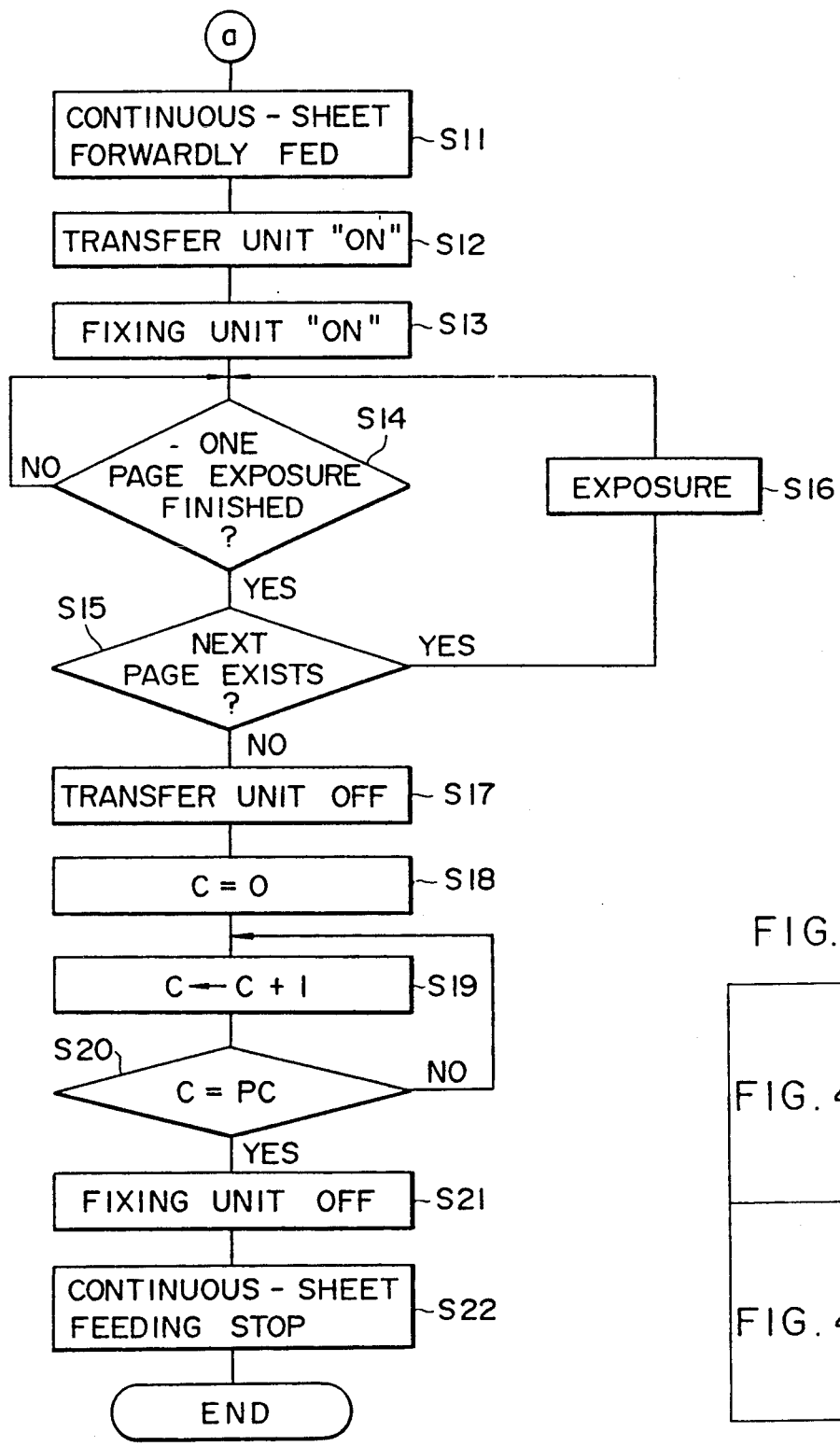
Figure 4B:
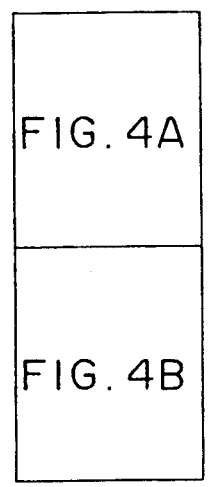

Next, with reference to the flowchart shown in FIG. 4, the control operation effected by the control unit 50 of the laser beam printer, arranged as described above will be described hereinafter.

First, the state of the fan-folded sheet 20 is sensed in response to sensing signals from the recording sheet sensors 30P, 30F and 30R. Note that the corona charging unit 71 of the transfer unit 7 and the heat roller 81 of the fixing unit 8 are in a swingingly retracted state at the time (S1, S2, S3).

When the sensor "P" is turned "OFF", that is, when the fan-folded sheet 20 is not detected, it is determined that the fan-folded sheet 20 is not inserted and the fan-folded sheet 20 is requested to be inserted by the indication of "NO SHEET" (S41).

Figure 3A:
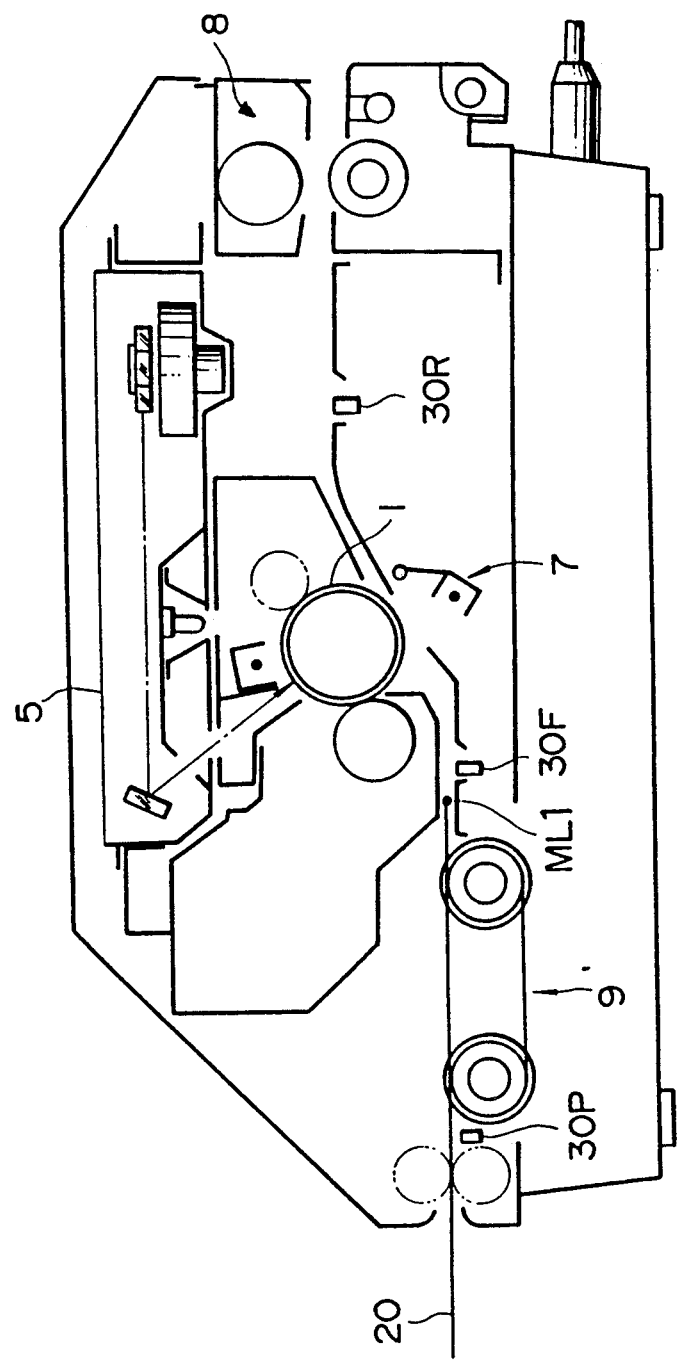
Figure 3B:
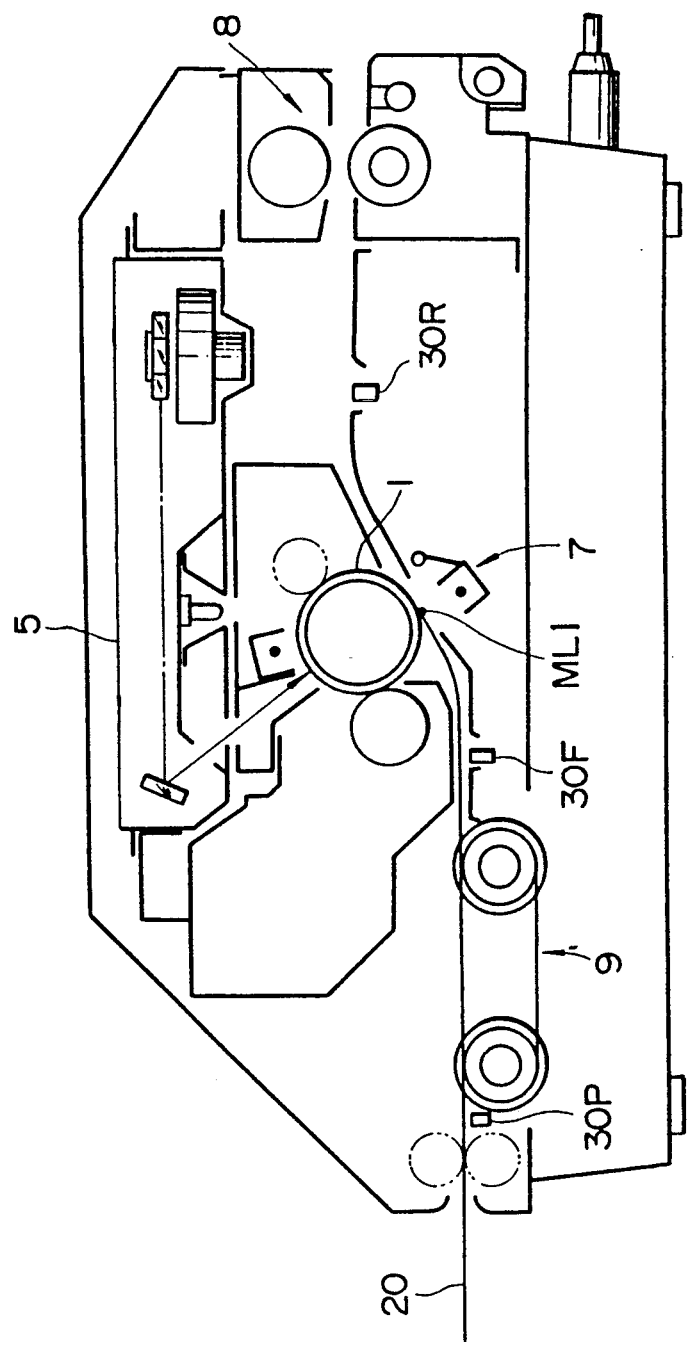
Figure 3C:
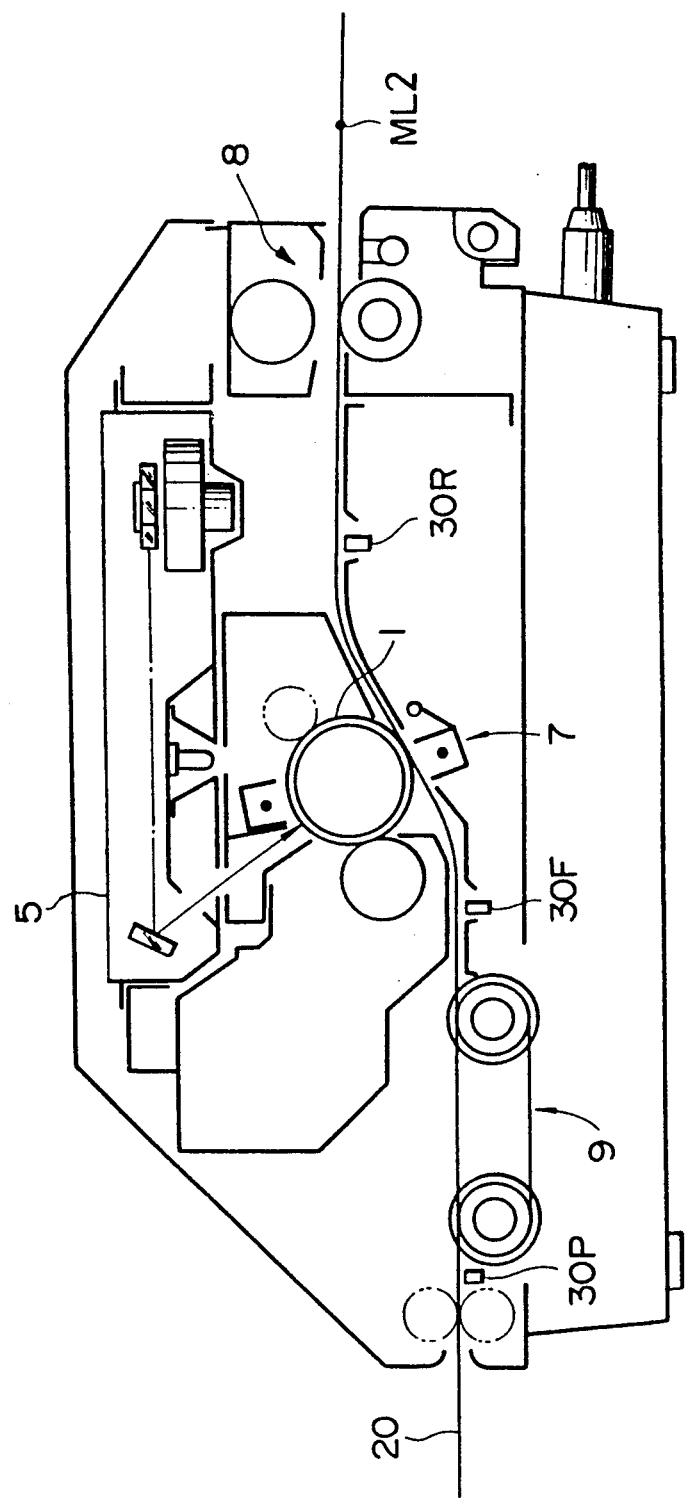

When the sensor "P" is turned "ON" and the sensor "F" is turned "OFF", it is determined that the fan-folded sheet 20 is set and thus the tractor 9 is driven to forward the fan-folded sheet 20, as shown in FIG. 3A (S31), and when the leading edge "ML1" thereof is located at a predetermined position corresponding to the transfer unit 7, the tractor 9 is stopped, as shown in FIG. 3B. FIG. 3B shows the output waiting state, wherein a preparation, for outputting image onto the recording sheet 20 has been completed. The fan-folded sheet 20 is set to the output waiting state in such a manner that the recording sheet sensor 30F senses the fan-fold paper 20 being fed (is turned "ON") to determine the position of the leading edge "ML1" thereof and thereafter it is controlled based on feed information from the encoder 93 (based on pulse signals in synchronism with the feed of the fan-folded sheet 20 applied from the encoder 93). More specifically, since the number of pulses: N, which is necessary for the fan-folded sheet 20 to move to the output waiting state (once the leading edge "ML1" has been sensed by the recording sheet sensor 30F), is known in advance, the output waiting state can be correctly achieved in such a manner that when the recording sheet sensor 30F senses the leading edge of the fan-folded sheet 20 (S32), a count of pulses from the encoder 93 is begun (S33, S34), and when the number of pulses counted amounts to "N", the feed of the fan-folded sheet 20 is stopped (S35, S8). Although it is not described, in detail the feed of the fan-folded sheet 20 is hereinafter controlled based on feed information from the encoder 93, i.e., by counting the pulses. When the recording sheet sensor 30F (sensor "F") is turned "ON", it is confirmed that the fan-folded sheet 20 has been loaded, and, next, when the recording sheet sensor 30R (sensor "R") is turned "ON", it is determined that the fan-folded sheet 20 is in an output completion state, shown in FIG. 3C, to be described later and thus the tractor 9 is rotated reversely to retract the fan-folded sheet 20 (S4) until the output waiting state shown in FIG. 3D is achieved. That is, one page of the recording sheet is moved backwardly. The symbol "ML2" in FIGS. 3C and 3D designates a leading edge of the succeeding page. The recording sheet 20 is cut at "ML2" when the sheet 20 reaches the output completion state shown in FIG. 3C. This rearward movement of one page is also controlled in such a manner that pulses from the encoder 93 are counted (S5, S6) and the reverse feed is stopped when the number of pulses counted amounts to the count: "PC" corresponding to the number of pulses of the one page of the used fan-folded sheet 20 (S7, S8).

Here, the count: "PC" corresponding to the one page of the fan-folded sheet 20 is set based on the sheet size input operation by means of the panel 41 and stored in the memory 51. For example, in the present invention, since the encoder 93 is rotated in synchronism with the endless belts 91, 91 of the tractor 9 and the slits thereof are defined to correspond to the projections of the endless belts 91, 91 (i.e., correspond to the feed holes of the fan-folded sheet 20 defined at an interval of ½ inch), a "PC" of the fan-folded sheet 20 having a distance between perforated tear lines set to 11 inches has 22 pulses, a "PC" of the fan-folded sheet 20 having a distance between perforated tear lines set to 12 inches has 24 pulses, and a "PC" of the fan-folded sheet 20 having a distance between perforated tear lines set to 13 inches has 26 pulses. With this arrangement, the printer is interchangeably applicable to the fan-folded sheet 20 having a plurality of kinds of distances between perforated tear lines.

After the leading edge (ML1) of the fan-folded sheet 20 has reaches to the output waiting state corresponding to the transfer unit 7, the rotation of the photoconductive drum 1 and the exposure from the scanning optical system 5 are started (S9, S10). In addition, although it is not shown in FIG. 4, as the photoconductive drum 1 starts rotation, the toner cleaning unit 2, the charge removing unit 3, the charging unit 4, and the developing unit 6 begin their respection operations.

The forward movement of the fan-folded sheet 20, caused by driving of the tractor 9, the return of the corona charging unit 71 to the transfer position and the transfer action thereof are started in synchronism with the arrival of a portion of the photoconductive drum 1 to be exposed by the scanning optical system 5 at the transfer unit 7 which is caused by the rotation of the photoconductive drum 1 (S11, S12). As a result, a toner image on the surface of the photoconductive drum 1 is transferred onto the fan-folded sheet 20.

The heat roller 81 of the fixing unit 8 is swingingly turned in synchronism with the arrival of the portion of the fan-folded sheet 20 where the toner image is transferred from the photoconductive drum 1 at the fixing unit 8 caused by the forward movement of the fan-folded sheet 20, and fixing action starts (S13).

After one page has been exposed as described above, it is determined whether there is a succeeding page or not (S14, S15).

When there is a succeeding page, exposure thereto is started continuously (S16).

When there is no succeeding page, the operation of the transfer unit 8 is stopped and the corona charging unit 71 is swingingly retracted (S17) at the same timing as for the start of operation, pulses from the encoder 93 are counted (S18, S19), the operation of the fixing unit 8 is stopped (including the swinging retraction of the heat roller 81) (S21) when the number of pulses counted amounts to the count: "PC" corresponding to the one page of the fan-folded sheet 20 (S20), and the drive of the tractor 9 is stopped to interrupt the feeding of the fan-folded sheet 20. This state is shown as an output completion state in FIG. 3C.

When image formation has been completed for one page, the leading edge of the page next to the page on which an image has been formed is in the output waiting state when it is observed based on the leading edge of the image-formed page, and thus when the fan-folded sheet 20 is fed an amount corresponding to the count PC corresponding to one page (i.e., the length of one page), the image formed-page is fed forwardly of the fixing position of the fixing unit 8 (this is because the recording paper feed length from the transfer position of the transfer unit 7 to the fixing position of the fixing unit 8 is set shorter than the distance between the perforated tear lines of the fan-folded sheet 20). The image-formed page is securely subjected to the fixing action and the position of the perforated tear line between the image-formed page and the leading edge of the next page is sufficiently projected externally of the laser beam printer so that cutting off along the perforated tear line can be easily effected.

The fan-folded sheet 20, after an output operation, is cut off along the perforated tear line for use and the leading edge "ML2" of the next page is formed by the cutting off operation. In the next image formation, the fan-folded sheet 20 is put in the output waiting state, as shown in FIG. 3D, by being fed reversely a length corresponding to one page as described above (since the output completion state is achieved by feeding the fan-folded sheet 20 forwardly a length corresponding to one page from the output waiting state, the output waiting state is necessarily achieved by retracting it a length corresponding to one page from the output completion state), and then image formation begins. Note that when the image-formed page is not cut off along the perforated tear line after the output has been completed, the image-formed page is pulled into the laser beam printer in the next output, which causes no problem since it has been already fixed by the fixing unit 8.

With the above mentioned arrangement, the page on which the image is formed is securely fixed and discharged from the printer in the state that it can be cut off, and when the next output is carried out, the fan-folded sheet 20 is retracted so that an output can be carried out from the first page (the first page formed by cutting off the previous page: when the previous page is not cut off, the page next to the page on which the previous output was carried out). Therefore, the fan-folded sheet 20 is not wasted when the output begins and further a length of the recording paper feed path from the transfer unit to the fixing position of the fixing unit can be set independently of a distance between the perforated tear lines of the fan-folded sheet 20, whereby the printer can be made small in size and applied to various kinds of recording sheet respectively having a different distance between perforated tear lines.

Figure 5A:
FIGS. 5A through 5C are views for explaining the positional relationships of the distance from the drum to the rollers and an the interval between perforated tear lines of the continuous-form recording sheet.
Figure 5B:
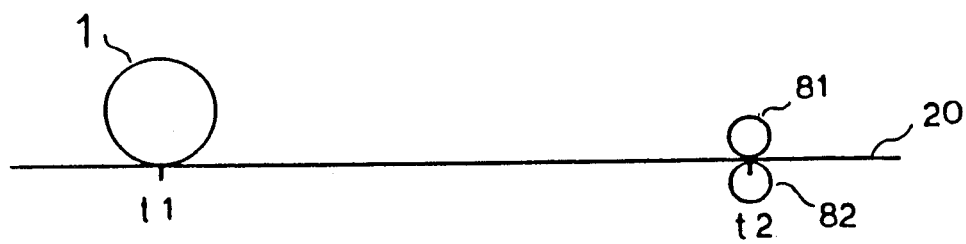
Figure 5C:
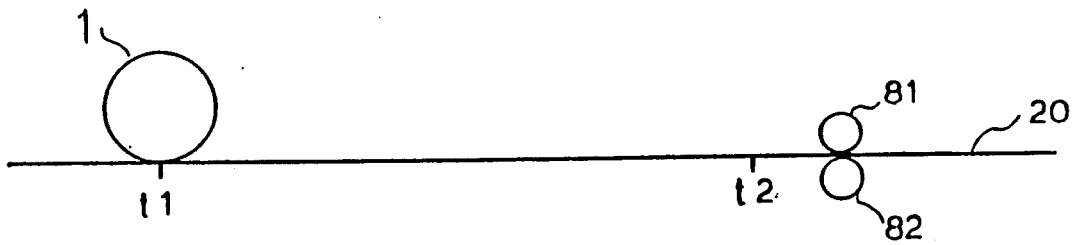

In the above embodiment, the distance between the photoconductive drum 1 and the pair of rollers is arranged to be less than an interval between the perforated tear lines t1 and t2, as illustrated on FIG. 5A, for making small the total volume of the laser beam printer. In this case, the trailing edge of the page on which the toner has been adhered is forwardly located with respect to the pair of rollers 81, 82 when the fan-folded sheet 20 is fed in an amount corresponding to one page. However, it may be considered that, as illustrated on FIGS. 5B, 5C, the distance between the drum 1 and the rollers 81, 82 is arranged to be substantially same as, or to be larger than the interval between t1 and t2 in connection with the factors included in designing the laser beam printer. In these cases, the fan-folded sheet 20 is controlled so as to be fed in an amount larger than that corresponding to one page after the toner adhesion operation has been executed by the photoconductive drum 1.

What is claimed is:

1. A printing device, capable of employing at least a continuous-form recording sheet having a plurality of printing segments on which an image is to be formed, each of said segments defined by a plurality of perforations provided on said continuous-form recording sheet at a predetermined interval, feeding means for feeding said continuous-form recording sheet along a predetermined feeding path, forming means for forming an image on said continuous-form recording sheet, and fixing means for fixing the image formed by said forming means on said continuous-form recording sheet, said printing device further comprising:

discriminating means for discriminating whether the forming of the image on said continuous-form recording sheet is completed;

first controlling means for controlling said feeding means so as to feed said continuous-form recording sheet such that a trailing end of a segment, on which the forming of the image has been completed, is located at a predetermined position following said fixing means, when said discriminating means discriminates that the forming of the image is completed; and second controlling means for controlling said feeding means in such a manner that said trailing end is located at said forming means after said trailing end is located at said predetermined position, whereby a leading edge of the next recording segment is located at said forming means.

2. The printing device according to claim 1, wherein said feeding means further reversely feeds said continuous-form recording sheet along said predetermined feeding path.

3. The printing device according to claim 1, wherein an interval between said forming means and said fixing means is smaller than the length of said segment.

4. The printing device according to claim 1, wherein an interval between said forming means and said fixing means is substantially the same as the length of said segment.

5. The printing device according to claim 1, wherein an interval between said forming means and said fixing means is larger than the length of said segment.

6. The printing device according to claim 1, wherein said predetermined position is external to said printing device.

7. The printing device according to claim 1, wherein said forming means comprises a photoconductive drum member on which a latent image is formed, the circumferential surface of said drum member is arranged to be contacted, at a contact point, with said continuous-form recording sheet for transferring the latent image onto said continuous-form recording sheet as a toner image, and wherein said fixing means comprises a pair of rollers arranged to be contacted with a surface of said continuous-form recording sheet on which the toner image has been formed, said pair of rollers being adapted to be brought into and out of contact with each other and one of said pair of rollers is a heat roller.

8. The printing device according to claim 7, wherein said first controlling means comprises detecting means, provided prior to said contact point of said photoconductive drum member and said continuous-form recording sheet along said predetermined feeding path, for detecting passing of a leading edge of said continuous-form recording sheet, and counting means for counting a feeding amount of said continuous-form recording sheet after the detection of said detecting means.

9. The printing device according to claim 8, wherein said detecting means comprises a reflection type photosensor for detecting the existence of said continuous-form recording sheet.

10. The printing device according to claim 8, wherein said counting means comprises a pulse generating member for generating pulses in accordance with a feeding operation of said continuous-form recording sheet, and a counting member for counting the number of pulses until said leading edge of said continuous-form recording sheet reaches said predetermined position, and wherein said second controlling means controls said feeding means so as to reversely feed said continuous-form recording sheet an amount corresponding to the number of pulses counted by said counting member.

11. The printing device according to claim 10, wherein said pulse generating member comprises a plate member, arranged to be rotated in accordance with the feeding of said continuous-form recording sheet, having a plurality of slits, each slit radially extending towards the rotary center of said plate member, and a photo-interrupter member for detecting the passing of one of said slits, whereby the length that said continuous-form recording sheet has been fed is counted by each detection of said slits.

12. The printing device according to claim 10, which further comprises third controlling means for controlling said feeding means so as to locate said leading edge of a segment of said continuous-form recording sheet at the contact point of said photoconductive drum member and said continuous-form recording sheet.

13. The printing device according to claim 12, wherein said third controlling means comprises said detecting means, provided prior to said contact point of said photoconductive drum and said continuous-form recording sheet along said predetermined feeding path, for detecting the passing of said leading edge of a segment of said continuous-form recording sheet, said counting member counting a number of pulses till said leading edge of said continuous-form recording sheet reaches said contact point.

14. The printing device according to claim 12, which further comprises another detecting means provided previously to said detecting means for detecting said leading edge of a segment of said continuous-form recording sheet, and representing means for representing a predetermined indication in case that said leading edge of said continuous-form recording sheet is not detected by means of said another detecting means.

15. A printing device utilizing an electrophotographic system, capable of employing a continuous-form recording sheet having a plurality of printing segments on which an image is to be formed by a forming operation, each of said segments being defined by a plurality of perforations provided on said continuous-form recording sheet at predetermined intervals, and comprising:

discriminating means for discriminating whether the forming of the image on said continuous-form recording sheet is completed;

first controlling means for controlling the feeding of said continuous-form recording sheet in such a manner that a trailing end of a segment on which the forming operation has been finished is located at a predetermined position following a position at which fixing is executed when it is discriminated by said discriminating means that the forming is completed; and second controlling means for controlling the feeding of said continuous-form recording sheet such that said trailing end is located at another position, at which forming is executed, after said trailing end has been located at said predetermined position, whereby a leading edge of the segment succeeding the segment on which the forming operation has been finished, is located at said another position.

16. A printing process employed in a printing device utilizing an electrophotographic system, capable of employing at least a continuous-form recording sheet having a plurality of printing segments on which an image is to be formed, each of said segments defined by a plurality of perforations provided on said continuous-form recording sheet at a predetermined interval, and comprising:

forming an image on said continuous-form recording sheet;

fixing the image formed on said continuous-form recording sheet;

locating a trailing end of a segment on which forming has been completed, at a predetermined position following a position at which fixing is performed; and locating the trailing end at a position at which the forming is executed, whereby a leading edge of the next succeeding segment is located at said position at which the forming is performed.

17. A printing device, capable of employing at least a continuous-form recording sheet having a plurality of printing segments on which an image is to be formed, each of said segments defined by a plurality of perforation lines provided on said continuous-form recording sheet at a predetermined interval, comprising:

feeding means, including a pair of endless belts, for feeding said continuous-form recording sheet along a predetermined feeding path;

forming means, including a photoconductive drum member on which a latent image is formed, whose circumferential surface is arranged to be contacted, at a contact point, with said continuous-form recording sheet, for transferring the latent image onto said continuous-form recording sheet as a toner image, and for forming the image on said continuous-form recording sheet;

fixing means, including a pair of pressure heat rollers, for fixing the image formed by said forming means on said continuous-form recording sheet;

discriminating means for discriminating whether the forming of the image on said continuous-form recording sheet is completed;

first controlling means for controlling said feeding means so as to feed said continuous-form recording sheet in such a manner that a trailing end of a segment on which the forming of an image is completed is located at a predetermined position following said fixing means when said discriminating means determines that the forming of the image is finished, said predetermined position being a position located externally of said printing device; and second controlling means for controlling said feeding means in such a manner that said trailing end is located at said forming means after said trailing end is located at said predetermined position, whereby a leading edge of the next succeeding segment is located at said forming means.

18. The printing device according to claim 17, wherein said feeding means further reversely feeds said continuous-form recording sheet along said predetermined feeding path.

19. The printing device according to claim 17, wherein an interval between said forming means and said fixing means is smaller than a length of said segment.

20. The printing device according to claim 17, wherein an interval between said forming means and said fixing means is substantially same as a length of said segment.

21. The printing device according to claim 17, wherein an interval between said forming means and said fixing means is larger than a length of said segment.

22. The printing device according to claim 17, wherein said controlling first means comprises detecting means, provided previous to said contact point of said photoconductive drum and said continuous-form recording sheet along said predetermined feeding path, for detecting a passing of a leading edge of said continuous-form recording sheet, and counting means for counting an amount of feeding of said continuous-form recording sheet after the detection of said detecting means.

23. The printing device according to claim 22, wherein said detecting means comprises a reflection type photo-sensor for detecting the existence of said continuous-form recording sheet.

24. The printing device according to claim 22, wherein said counting means comprises a pulse generating member for generating pulses in accordance with a feeding operation of said continuous-form recording sheet, and a counting member for counting a number of pulses till said leading edge of said continuous-form recording sheet reaches said predetermined position, and wherein said second controlling means controls said feeding means so as to reversely feed said continuous-form recording sheet in an amount corresponding to the number of pulses counted by said counting member.

25. The printing device according to claim 24, wherein said pulse generating member comprises a plate member, arranged to be rotated in accordance with the feeding operation of said continuous-form recording sheet, having a plurality of slits each radially extending towards the rotary center of said plate member, and a photo-interrupter member for detecting a passing of one of said slits, whereby the length of said continuous-form recording sheet is counted by each of detections said slits.

26. The printing device according to claim 24, which further comprises third controlling means for controlling said feeding means so as to locate said leading edge of said continuous-form recording sheet at the contact point of said photoconductive drum member and said continuous-form recording sheet.

27. The printing device according to claim 26, wherein said third controlling means comprises said detecting means, provided previously to said contact point of said photoconductive drum and said continuous-form recording sheet along said predetermined feeding path, for detecting a passing of said leading edge of said continuous-form recording sheet, said counting member counting a number of pulses till said leading edge of said continuous-form recording sheet reaches said contact point.

28. A sheet feeding mechanism, adapted to be positioned in a printing device utilizing at least a continuous-form printing sheet having a plurality of segments successively connected by means of a plurality of perforation lines, capable of reciprocally feeding said continuous-form printing sheet, said sheet feeding mechanism further comprising:

first controlling means for controlling the feeding of said continuous-form printing sheet in such a manner that a trailing edge of a segment on which a printing operation is finished is located at a first predetermined position external to said printing device; and second controlling means for controlling the feeding of said trailing edge so as to locate said trailing edge at a second predetermined position within said printing device.

29. The sheet feeding mechanism according to claim 28, wherein said second predetermined position comprises a position at which a printing operation is executed.

30. The sheet feeding mechanism according to claim 28, wherein said printing device employs a photoconductive member on which a latent image is formed to be developed and transferred onto said continuous-form printing sheet as a toner image.

* * * * *

UNITED STATES PATENT AND TRADEMARK OFFICE
CERTIFICATE OF CORRECTION

PATENT NO. : 5,063,416
DATED : November 5, 1991
INVENTOR(S) : R. HONDA et al.

It is certified that error appears in the above-indentified patent and that said Letters Patent is hereby corrected as shown below:

At column 9, line 40 (claim 12, line 5), change "the" to ---said---.

At column 11, line 26 (claim 22, line 2), change "controlling first" to ---first controlling---.

At column 12, line 12 (claim 26, line 4), change "the" to ---said---.

Signed and Sealed this

Seventeenth Day of September, 1996

Attest:

BRUCE LEHMAN

Attesting Officer     Commissioner of Patents and Trademarks